Dec. 26, 1922.
L. E. SLAUSON.
TRACTION WHEEL.
APPLICATION FILED JUNE 9, 1919.
1,439,847
2 SHEETS—SHEET 2.
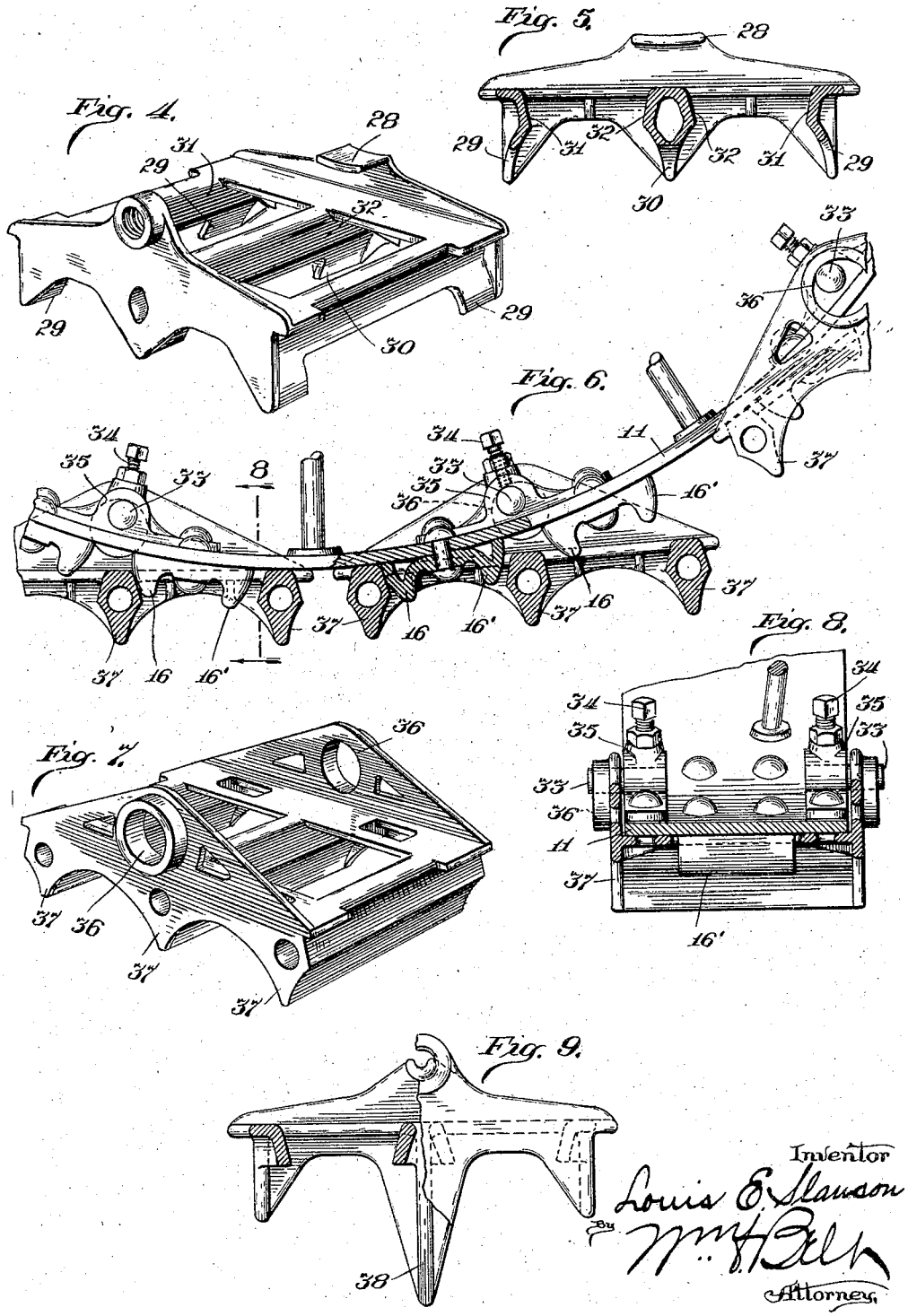

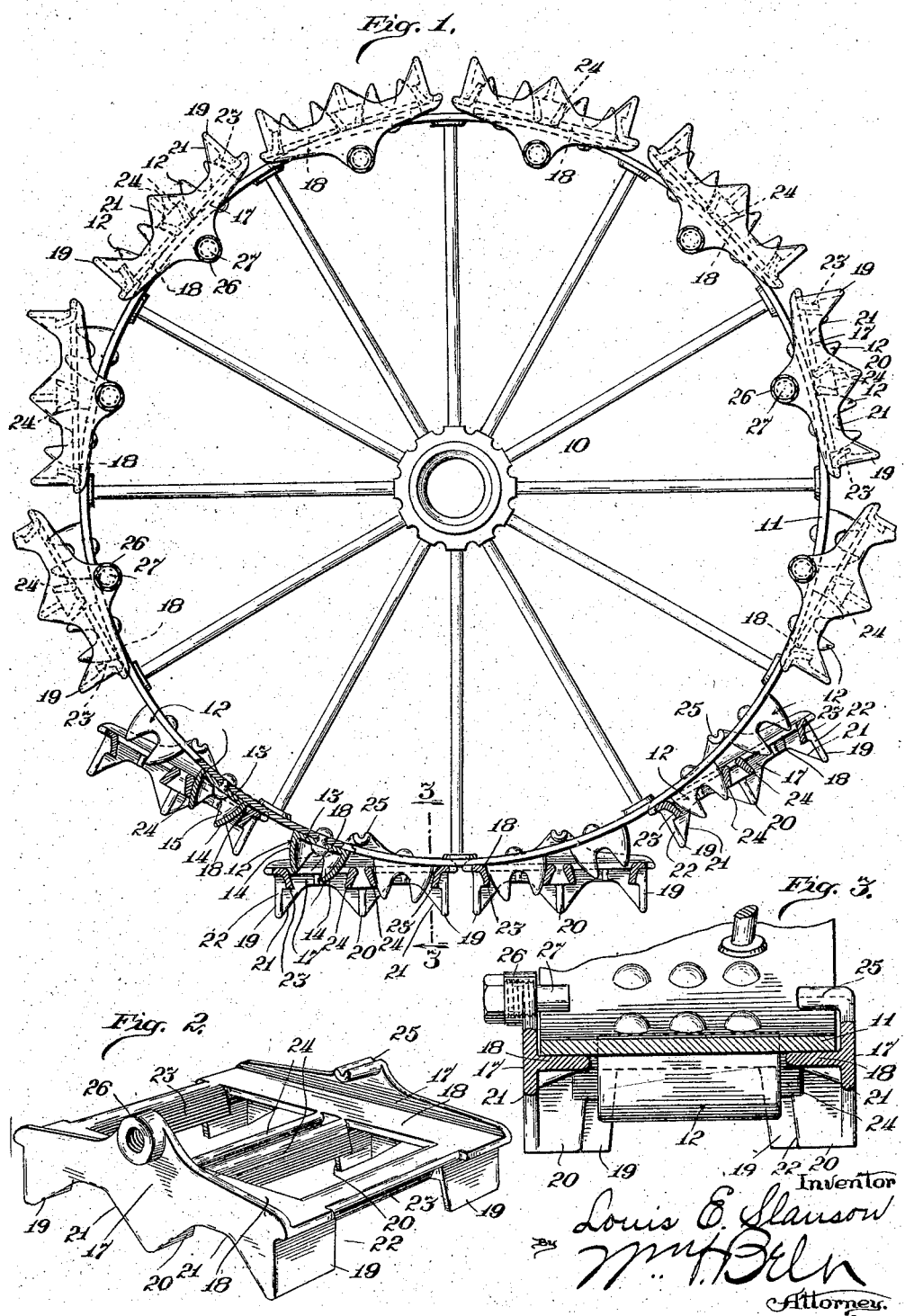

Patented Dec. 26, 1922.

1,439,847

UNITED STATES PATENT OFFICE.

LOUIS E. SLAUSON, OF ROCK ISLAND, ILLINOIS, ASSIGNOR TO GRID-IRON-GRIP COMPANY, OF ROCK ISLAND, ILLINOIS.

TRACTION WHEEL.

Application filed June 9, 1919. Serial No. 302,680.

*To all whom it may concern:*

Be it known that I, LOUIS E. SLAUSON, a citizen of the United States, residing at Rock Island, in the county of Rock Island and State of Illinois, have invented certain new and useful Improvements in Traction Wheels, of which the following is a specification.

The primary object of this invention is to convert an ordinary smooth rim wheel into a traction wheel by the application thereon in a novel manner of a plurality of traction shoes so constructed and so mounted on the rim of the wheel that as the wheel revolves they will automatically adjust themselves in proper position for forward or reverse travel to lay a smooth and practically unbroken track over which the rim of the wheel travels smoothly and evenly and without slippage.

An especially important feature of the invention is the provision of fixed means on the rim of the wheel for positively controlling the movement of the shoe, which is loosely hung on the rim and is movable relatively thereto, so that the shoes will be laid down upon the ground substantially flatwise and similarly elevated from the ground, causing only a limited disturbance of the surface over which the wheel travels, and so that before the rim rolls off of one shoe in its travel the next adjacent shoe will be properly positioned upon the ground to receive it, whereby a track sectional in form but continuous in effect is constantly provided upon which the rim of the wheel may travel in either direction.

Another object of the invention is to provide a wheel with track laying shoes which will avoid that excessive packing of soft ground, such as a plowed field, which affects the crops to a more or less extent and is so seriously objected to by farmers.

Further objects of the invention are to provide a traction shoe of simple form and construction which can be produced at low cost as a one-piece casting and easily applied to an ordinary vehicle wheel; to mount the shoes in such a manner on the wheel rim so that notwithstanding they are independently movable relatively to the rim and to each other they will always be presented flatwise to the ground surface in regular spaced position to form a track upon which the rim travels smoothly and evenly; to provide interengaging parts between the rim and the shoe which will insure proper positioning of the shoes and which will also operate to free the shoe from any clods which may adhere to the shoe in traveling over soft ground; to provide the shoe with cross-bars of novel construction spaced apart to engage the ground surface and which will enter and leave soft ground without materially injuring the surface and without causing any lateral shifting of the earth between the cross-bar marks therein; and to construct the shoe so that the wheel may travel over hard pavements without injury thereto and over soft ground without sinking deeply therein.

The invention has other objects in view which are incidental to the primary object of providing parts of simple construction which can be easily applied to the rim of a wheel to convert the wheel into a traction wheel and provide therefor a track on which the rim travels continuously without jarring or jolting, which incidental objects will appear hereafter in the detail description.

In the accompanying drawings I have illustrated my invention in several forms which I have found to be satisfactory in actual use, and referring thereto:

Fig. 1 is an elevation, partly in section, of a traction wheel embodying the invention in what I now consider a preferred form.

Fig. 2 is a perspective view of a shoe shown in Fig. 1.

Fig. 3 is a transverse sectional view on line 3—3 of Fig. 1.

Fig. 4 is a perspective view and Fig. 5 a longitudinal sectional view of another form of shoe.

Fig. 6 is a sectional view showing several shoes of another form.

Fig. 7 is a perspective view of the shoe shown in Fig. 6.

Fig. 8 is a transverse sectional view on line 8—8 of Fig. 6.

Fig. 9 is a longitudinal sectional view of a shoe which is especially adapted for soil with a loose or sandy top.

Referring to the drawings 10 designates generally a metal wheel which may be of any usual construction provided with a rim. It is customary in some cases to equip traction wheels with lugs, cleats or similar devices permanently fastened to the rim by bolts passing therethrough, and in other cases provision is made to attach some form of detachable lugs to the rim whenever the wheel is used for travel on soft ground, as in plowing. My invention is adapted to be applied to old wheels as well as to new wheels and I contemplate that wheel manufacturers in the future will punch the rims of their wheels so that my invention may be applied to the rims by the tractor manufacturer or by the purchaser as and when desired. And while the invention may be readily removed from the wheel if no longer required I particularly direct attention to the fact that this is not necessary for travel on hard pavements or road beds, as it is with some of the devices which are detachably applied to traction wheels, because the shoes will not dig into or otherwise injure a hard surface since they have no lateral movement on the surface.

A plurality of teeth 12 are bolted, riveted and otherwise securely fastened to the rim in pairs at spaced intervals. These teeth are shorter than the width of the rim and they are located centrally of the rim as shown in Fig. 3. In the form shown in Figs. 1, 3 each tooth has a base 13, curved sides 14 and recessed ends 15, forming in effect a hollow tooth having a substantially flat base to engage the rim and two longitudinal prongs formed by the curved sides. This tooth may be made of cast steel, chilled iron, or any other suitable material. In the form illustrated in Figs. 6, 7 the tooth is cast with two hollow prongs 16, 16', the general shape being substantially the same as that of the form shown in Figs. 1, 3 but somewhat heavier.

At spaced intervals determined by the pairs of teeth traction shoes are loosely mounted on the face of the rim by means on each shoe located at the back of the rim between the teeth of each pair. Each shoe is preferably a one-piece steel casting but it can be cast in parts suitably assembled, or made of any other material, or it may be fabricated if so desired. The shoes are all made alike, in grid or skeleton form, and each comprises parallel sides 17, inwardly directed parallel track flanges 18, end ground engaging cross-bars 19, and a middle ground engaging cross-bar 20 with openings between the bars. The sides are cut out at 21 between the cross-bars, and the flanges 18 extend inwardly closely adjacent to the ends of the teeth. (Fig. 3.) The cross-bars of Figs. 1–3 are of a single thickness and extend perpendicular to the flanges and they may extend continuously across from side to side of the shoes or they may be cut away at the center as shown at 22 Figs. 2, 3.

Each end cross-bar has at its top and on the inner side thereof an inwardly inclined bearing flange 23, and similarly located at each side of the middle cross-bar there is an outwardly inclined bearing flange 24, these bearing flanges being arranged and inclined to engage and be engaged by the teeth in or about in the manner indicated in Fig. 1.

The sides of the shoe extend above the track flanges 18 sufficiently to enclose the side edges of the rim 11, and one side is provided with an integral hook or lip 25 and the other side is provided with a lug 26 bored and threaded to receive a bolt 27. The hook and the bolt are disposed opposite each other and are spaced from the track flanges sufficiently to loosely connect the shoe with the rim so that the shoe will have a considerable play or movement relative to the rim. The middle cross-bar of the shoe is located between the teeth of a pair and the parts are so proportioned that the shoe will have the desired amount of loose play relative to the rim so that each shoe may shift its position by gravity as the wheel revolves as indicated in Fig. 1. Since the shoes are loose and shift by gravity they may not always assume the exact position indicated and this should be understood in examining Fig. 1. Thus the shoe is freely movable within certain fixed limits on the rim and is induced to move by gravity and by the engagement of the teeth and bearing flanges so that each shoe will be presented in a substantially horizontal position to the surface over which the wheel travels, and will be picked up in a substantially horizontal position from said surface after the radial center of the wheel has passed thereover.

The shoes illustrated in Figs. 4–9 are made to be loosely connected to the rim of the wheel to move freely relative thereto in all substantial respects as heretofore described. They differ in construction from the shoe heretofore described but the principle of the operation is the same.

Referring to Figs. 4 and 5 the hook or lip 28 is somewhat wider than that shown in Figs. 1–3, and the end ground engaging cross-bars 29 are outwardly inclined or curved, while the middle ground engaging cross-bar 30 is wedge shaped, its sides being reversely inclined or curved. At the top of each end cross-bar there is an inwardly inclined bearing flange 31 and at the top of the middle cross-bar is preferably cored to reduce weight and the cross-bars are cut away somewhat more at the center than is shown in Figs. 1–3, for the same purpose.

In the construction of Figs. 6–8 transverse pins 33 are secured by set screws 34 in bearings 35 which are fastened to the rim and these pins project beyond the bearings to engage openings 36 in the sides of the shoe. The openings are circular in shape and of considerably greater diameter than the diameter of the pins so that the shoe may move freely relatively to the pin and to the rim, within limits determined by the openings and the pin and also by the teeth and the cross-bars, the function of which is the same as heretofore described. The cross-bars 37 are all made like the middle cross-bar of Figs. 4, 5. It will be noted that this construction is somewhat heavier than that of Figs. 1–3 and that the bearings and pins comprise additional parts. I have found this construction, as well as that of Figs. 4 and 5, to be entirely satisfactory in commercial use but I prefer the construction of Figs. 1–3, because it is lighter in weight and more easily made. Fig. 9 illustrates a shoe substantially like the one shown in Figs. 1–3 except that it has a deep middle cross-bar 38 which may extend continuously across from side to side of the shoe, or it may be cut away at the center as heretofore described. This shoe is intended for use where the soil is very loose or sandy.

In practice the teeth are disposed in pairs spaced equidistant around the rim and the shoes are then applied as shown in the drawings or in some equivalent manner. The parts are so proportioned that when the rim is completely equipped with teeth and shoes the ends of the shoes may approach each other in close juxtaposition, but without touching. Thus each shoe is at all times freely movable without interfering with or interference from either adjacent shoe. The wheel may be equipped with my invention at the factory and sold in its complete form, or the shoes and other parts may be sold separately in standard sizes for application to the wheel at any time. The simplicity of the invention makes it possible for anybody to apply the shoe and other parts to a wheel in the first instance and to remove and re-apply them as often as desired. It may be necessary to construct the parts of my invention in different sizes to fit wheels of different sizes but I believe that a comparatively few standard sizes will suffice.

The shoes travel with the rim of the wheel as the wheel revolves and they move freely, by gravity and by reason of the engagement of the teeth with the bearings on the cross-bars, to any position within their prescribed limits of movement, but they always maintain their position on the rim relative to each other and do not interfere or overlap at any time. Each shoe is engaged flatwise with the surface over which the wheel travels, that is to say, the shoe is presented horizontally to the surface so that by the time the rim travels thereon the shoe is at rest on the surface with all cross-bars thereof in engagement with the surface. Hence, if the cross-bars are forced into the surface by the weight carried by the wheel they will enter the surface evenly and make clean cuts without shifting the earth between these cuts. The flanges and the cross-bars provide an extended track surface for engagement with the rim so that the weight carried by the wheel is distributed over a considerable area which reduces the penetration of the cross-bars in the surface. Because the shoes are presented flat to the ground and lifted therefrom in a similar manner the cross-bars do not dislodge the ground between the cross-bar marks therein by a spade-like action as commonly occurs when wheel rims are equipped with cleats, lugs or similar traction devices.

By reference to the drawings, it will be noted that before the wheel rim has rolled from one shoe another shoe will be properly positioned to receive it, and since the shoes are thus positioned in close juxtaposition and in alinement there is provided a sectional track which is carried by the rim and laid as the wheel travels and forming, to all intents and purposes, a continuous track for the rim. Each shoe is laid flat upon the ground before it receives the weight of the wheel and this is important because it prevents the shoe from digging in the ground at one end as would happen if the weight were applied to that end before the rest of the shoe was properly placed on the ground. Furthermore, this provides for distributing the weight over the entire area of the shoe, whereby one shoe will lie flush, or substantially flush, with the next and provide a track which may for various reasons incline like the grade of a street pavement but which will always be smooth and even.

The shape of the shoe and its cross-bars, and the teeth, and the cooperative relation of the teeth and shoes, all serve their part in keeping the shoes clean and free from dirt clods, especially when plowing in soft ground. This is, of course, desirable to maintain the shoes at their highest efficiency. The ground engaging portions of the cross-bars of the shoe will make a narrow clean cut in the ground and withdraw therefrom without dragging dirt with them. It has been found in actual use that the shoes will keep clean,— that is to say, free from clods or accumulation of dirt which would interfere with their proper operation,—under all ordinary conditions, and this is due as before indicated, very largely to the shape of the shoes which are, in effect, self-cleaning and also to the location of the teeth in the openings between the cross-bars and the sides of the shoe and the movement of the shoe relative to the teeth. There will be a tendency, of course, in wet or very soft ground, for the dirt to stick to the shoes more or less, but due to the movable mounting of the shoes on the rim and the cooperative action of the shoes and teeth while the shoes travel with the rim, during which travel it will be noted that the shoes shift endwise on the rim, there is no liability of the shoes ever becoming clogged with dirt to such an extent that they will not be properly presented to the ground under any ordinary conditions. This is a very important feature of my invention and particularly because of the simple manner in which the result is accomplished.

It has also been found in the practical use of the invention that it eliminates slippage of the wheel,—so far as can be observed with the eye. This is also important because it is a fact, although it may appear extraordinary, that in a day's plowing the loss of distance due to slippage will be considerable, in fact it may exceed ten percent. This also involves a loss of fuel and time, besides the wear and tear on the machinery. Tractors equipped with my invention have been carefully watched on soft and on hard ground and on turf and no evidence of any material slippage has been observed. When it is understood that a tractor wheel with cleats or spurs will show slippage so plainly to the eye that critical examination is not necessary, and will shift the ground between cleats or spurs laterally in clods, the importance of my invention will be better appreciated.

Furthermore, the weight carried by the wheel is distributed over a considerable area, as indicated by the size of the shoe, and hence plowed ground will not be packed as it is with wheels equipped with cleats or lugs. This is also an important feature of the invention since packing soft ground will retard the growth of grain and other crops.

I am aware that changes in the form and proportion and arrangement of parts of my invention may be made without departing from the spirit or sacrificing the advantages thereof and I therefore reserve the right to make all such changes as fairly fall within the scope of the following claims.

I claim:

1. A traction shoe for attachment to the rim of a wheel and having a plurality of transverse ground engaging bars with openings between each pair of bars extending through the shoe from top to bottom thereof.

2. A traction shoe for attachment to the rim of a wheel and having two sides spaced apart and higher at the middle than at their ends to embrace the rim, and a plurality of transverse ground engaging bars connecting said sides and spaced apart to form openings between the sides and bars extending through the shoe from top to bottom thereof.

3. A traction shoe for attachment to the rim of a wheel and having two sides spaced apart and having openings therebetween extending through the shoe from top to bottom thereof, oppositely disposed inwardly directed flanges on said sides to form a track for the rim, and transverse ground engaging bars spaced apart and connecting said sides.

4. A traction shoe for attachment to the rim of a wheel and having two sides spaced apart, oppositely disposed flanges on the sides, and a plurality of transverse ground engaging bars spaced apart lengthwise of the shoe and connecting the sides and flanges, there being openings between the bars and flanges extending through the shoe from top to bottom thereof.

5. A traction shoe for attachment to the rim of a wheel and having parallel sides spaced apart and transverse ground engaging bars at each end of the shoe, the lower portions of said bars being parallel with each other and perpendicular to the sides, there being openings between the bars and flanges extending through the shoe from top to bottom thereof.

6. A traction shoe for attachment to the rim of a wheel and having two sides spaced apart, and transverse ground engaging bars connecting said sides at their ends to support the shoe flatwise on the ground, and said bars being cut away between their ends.

7. A traction shoe for attachment to the rim of a wheel and having transverse ground engaging bars at its ends and inwardly inclined bearing surfaces at the top of said bars.

8. A traction shoe for attachment to the rim of a wheel and having a plurality of transverse ground engaging bars comprising an intermediate bar having oppositely inclined bearing surfaces at the top thereof.

9. A traction shoe for attachment to the rim of a wheel and having a plurality of transverse ground engaging bars, there being an inwardly inclined bearing surface at the top of each end bar and oppositely inclined bearing surfaces at the top of the intermediate bar.

10. A traction shoe for attachment to the rim of a wheel and having transverse end bars and an intermediate bar spaced apart with openings therebetween, and sides connecting said bars, said sides being recessed between the ends of the bars.

11. A traction shoe for attachment to the rim of a wheel and having two sides, a plurality of transverse ground engaging members, a hook on one side of the shoe to engage the rim, and cooperating means on the other side of the shoe to secure the shoe to the rim and limit its movement relative to the rim, said hook and means being spaced from said transverse members to permit a considerable freedom of movement of the shoe relative to the rim.

12. A traction shoe for attachment to the rim of a wheel and having two sides, a plurality of transverse ground engaging members, one of said sides being provided with a hook to engage the rim adjacent one edge thereof and the other side having an opening therein, and a bolt in said opening to overlap the rim adjacent the other edge thereof, said hook and bolt being spaced from the transverse members to permit a considerable freedom of movement of the shoe relative to the rim.

13. A traction shoe for attachment to the rim of a wheel and having two sides, a plurality of transverse ground engaging members, a hook on one side spaced from said members to loosely engage the rim, an upstanding lug on the other side and having a transverse opening spaced like the hook from said members, and a horizontally disposed securing bolt in said opening to engage the back of the rim.

14. A skeleton traction shoe for attachment to the rim of a wheel and having flanges to form a track adapted to be engaged by the outer surface of the rim and having means at its sides to engage the inner surface of the rim for securing the shoe on the rim.

15. A traction shoe for attachment to the rim of a wheel and having longitudinally extending inwardly directed flanges at each side thereof to form a track to be engaged by the outer surface of the rim and having openings therebetween.

16. The combination with the rim of a wheel, of a traction shoe having longitudinally extending flanges at each side thereof to form a track to be engaged by the outer surface of the rim, and means carried by said shoe at the sides thereof to project over the back of the rim for securing the shoe in place on the rim at the edges thereof.

17. The combination with the rim of a wheel, of a traction shoe having a pair of sides spaced apart and adapted to project inwardly of the rim adjacent the side edges thereof, inwardly directed flanges on said sides to form a track for the rim, a plurality of transverse ground engaging bars connecting said sides and adapted to support the shoe flatwise on the ground, and cooperating means on said sides to engage the rim to secure the shoe on the rim and to permit a certain freedom of movement of the shoe relative to the rim.

18. The combination with the rim of a wheel, of teeth fastened on the outer surface of the rim, a traction shoe having a plurality of transverse ground engaging bars with intermediate openings to receive said teeth, and means for loosely engaging the shoe with the rim.

19. The combination with the rim of a wheel, of a pair of double pronged teeth secured on the outer surface of the rim in spaced relation, a shoe having transverse ground engaging bars with openings therebetween to receive the teeth, and means for loosely engaging the shoes on the rim.

20. The combination with the rim of a wheel, of a plurality of teeth having sloping sides secured on the outer surface of the rim in spaced relation, and a traction shoe having a plurality of transverse ground engaging bars with openings therebetween to receive the teeth, the surfaces of the bars disposed in adjacent relation to said teeth being inclined, and means for securing the shoe loosely on the rim.

21. The combination with the rim of a wheel, of a traction shoe having openings therein, means for securing the shoe movably on the rim, and teeth on the rim projecting through said openings and cooperating with said means to retain the shoe in position on the rim.

22. The combination with the rim of a wheel, of teeth on the outer face of the rim, and a traction shoe co-operatively engaged with said teeth and having means to engage the back of the rim to loosely mount the shoe on the rim so that it may have a freedom of bodily movement radially or peripherally of the wheel within limits determined by said teeth and said means.

23. The combination with the rim of a wheel, of a traction shoe having a pair of openings extending entirely through the shoe from top to bottom thereof and ground engaging bars to support the shoe flatwise on the ground, said bars being spaced apart lengthwise of the shoe and said openings being located between said bars with one of said bars separating said openings, means for loosely mounting said shoe on the rim, and a pair of teeth on the outer face of the rim operatively disposed in said openings.

24. The combination with the rim of a wheel, of a plurality of traction shoes, means on the shoes for engaging the back of the rim to loosely mount the shoes on the rim so that they may freely move bodily radially of the rim and freely tilt on the rim by gravity as the wheel revolves, and means on the face of the rim for limiting the movement of the shoes.

25. A traction shoe for attachment to the rim of a wheel and having a plurality of straight parallel and comparatively thin ground engaging bars with openings between each pair of bars extending through the shoe from top to bottom thereof.

26. A traction shoe for attachment to the rim of a wheel and having a plurality of straight parallel and comparatively thin ground engaging bars with openings between each pair of bars extending through the shoe from top to bottom thereof, and bearing surfaces at the top of said bars.

27. The combination with the rim of a wheel, of a traction shoe having a plurality of transverse ground engaging bars with openings between each pair of bars extending through the shoe from top to bottom thereof, means for loosely mounting the shoe on the rim, and teeth on the face of the rim engaging said openings.

28. The combination with the rim of a wheel, of a traction shoe having a plurality of straight parallel and comparatively thin ground engaging bars with openings between each pair of bars extending through the shoe from top to bottom thereof, means for loosely mounting the shoe on the rim, and teeth on the outer face of the rim engaging said openings.

29. The combination with the rim of a wheel, of a traction shoe having a plurality of transverse ground engaging bars with openings between each pair of bars extending through the shoe from top to bottom thereof, means loosely mounting the shoe on the rim, bearing surfaces at the edges of said openings, and teeth on the rim engaging said bearing surface.

30. The combination with the rim of a wheel, of a plurality of traction shoes mounted loosely end to end thereon and each having two ground engaging bars and an opening extending through the shoe, and a tooth on the rim engaging said opening to permit a considerable freedom of movement of the shoe relative to the rim, but limiting the movement of the shoe so that it will always be held within certain fixed limits and prevented from overlapping adjacent shoes.

31. The combination of a traction wheel rim, a plurality of teeth secured to said rim, each tooth having converging working faces extending outwardly from the rim, a plurality of traction shoes, each having an opening therethrough to receive one of said teeth, and inclined working faces to cooperate with said converging faces, and means for loosely connecting said shoes to the rim.

32. The combination with the rim of a wheel, a tooth fastened to the outer surface of the rim, a traction shoe having an opening therethrough to receive said tooth, and means for loosely engaging the shoe with the rim.

33. The combination with the rim of a wheel, of a plurality of teeth having sloping sides secured on the outer face of the rim in spaced relation, a plurality of traction shoes each having an opening therein to receive one of said teeth, the surfaces of said shoes adjacent to the sloping sides of the teeth being inclined, and means for securing the shoes loosely on the rim.

34. The combination with the rim of a wheel, a tooth fastened to the outer surface of the rim, a traction shoe having an opening therethrough to receive said tooth and means for loosely engaging the shoe with the rim including flanges on said traction shoe extending inwardly on each side of said rim.

35. In a traction wheel, a rim, a tread shoe loosely mounted thereon, and a rim element projecting through said shoe.

36. In a traction wheel, a rim, a shoe loosely mounted on the outer periphery of said rim and having a tread portion, and a rim element projecting outwardly through the shoe and beyond the tread portion of said shoe.

37. In a traction wheel, a rim, a tread shoe, outwardly extending elements on said rim projecting through said shoe, outwardly extending elements on said shoe, and means for loosely mounting said shoe on said rim so that said rim elements are adjacent said shoe elements and as the wheel is rotated, said shoe elements are projected and retracted relative to said rim elements.

LOUIS E. SLAUSON.

Witnesses:
J. V. NORMOYLE,
M. D. ETTLO.